May 14, 1963  C. D. BRADLEY  3,089,518
HYDRAULIC LOAD CELL FOR WEIGHING MACHINES
Original Filed Aug. 18, 1958  2 Sheets-Sheet 1

INVENTOR
Chester D. Bradley
BY
Blair Spencer + Buckles
ATTORNEYS

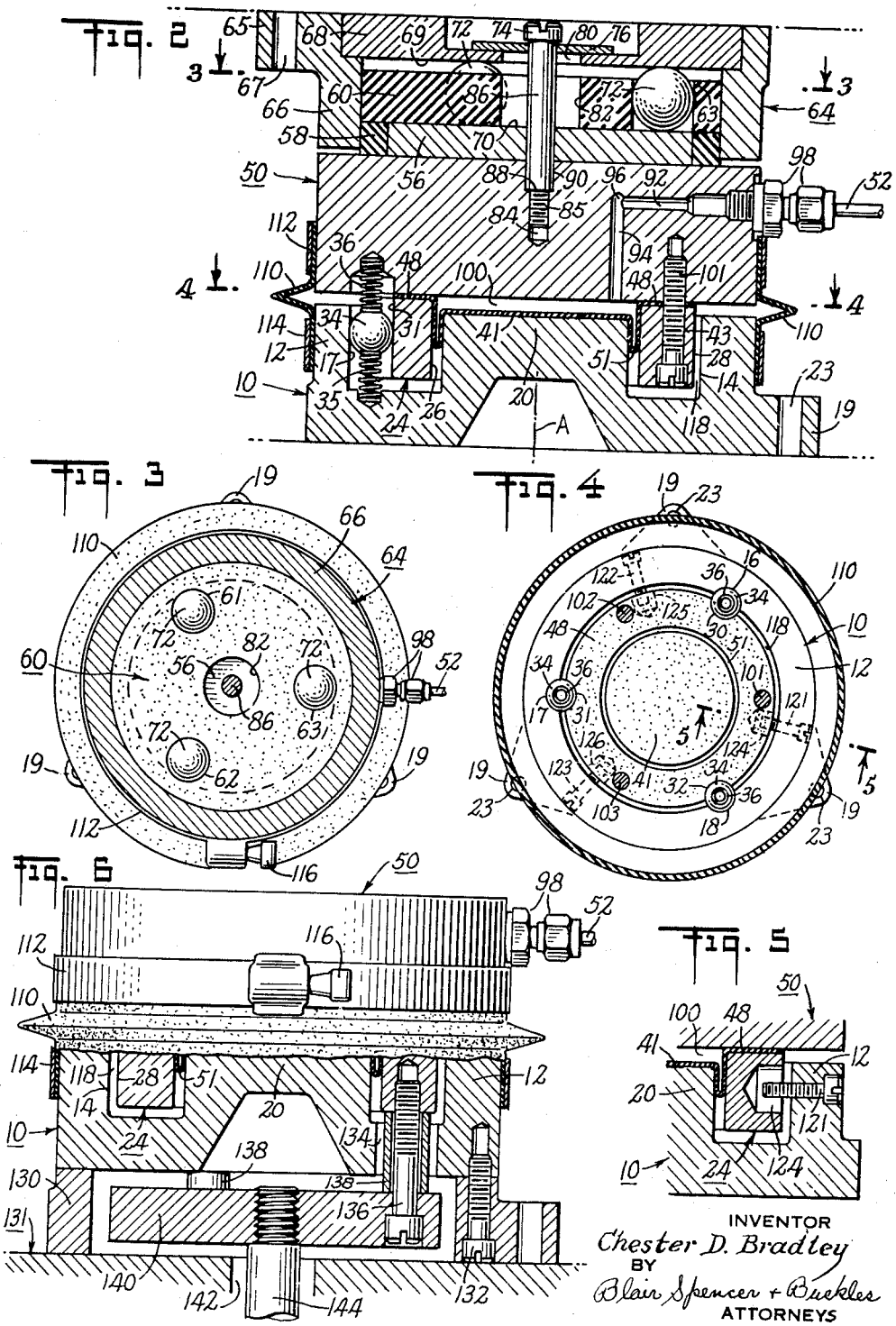

United States Patent Office 3,089,518
Patented May 14, 1963

3,089,518
HYDRAULIC LOAD CELL FOR WEIGHING MACHINES
Chester D. Bradley, Darien, Conn., assignor to
A. H. Emery Company, New Canaan, Conn.
Original application Aug. 18, 1958, Ser. No. 755,563, now Patent No. 2,960,113, dated Nov. 15, 1960. Divided and this application May 10, 1960, Ser. No. 28,107
8 Claims. (Cl. 137—778)

This invention relates to improvements in transducer mechanisms for weighing apparatus, and more particularly to an improved hydraulic pressure cell for use in weighing systems. The present application is a division of my copending application Serial No. 755,563, filed August 18, 1958, assigned to the same assignee herein, now U.S. Patent No. 2,960,113 issued November 15, 1960.

Where it is necessary to weigh heavy loads, as for example large chemical tanks and the like, fluid pressure weighing systems have generally been found more satisfactory than the beam scale type of weighing apparatus. Such a fluid pressure weighing system and apparatus is disclosed in the copending application of Malcolm C. Tate, Serial No. 670,048, filed July 5, 1957 and assigned to the same assignee as the present application. My herein disclosed invention relates to an improved hydraulic pressure sensitive cell capable of more sensitive and more accurate response over a wider range of variable loads, and to means for eliminating the undesirable effects of cross loads which are frequently encountered in addition to normal loads.

The cell of the present invention is particularly well suited to the measurement of various quantities of chemical or industrial materials, either liquid or dry, which may be loaded into a tank, bin, or hopper. In many industrial processes it is necessary to weigh accurately different quantities of various materials which may require to be mixed or otherwise employed in the process. Depending upon the character of the process, or the size of batch to be run in any given operation, the weights of the different materials employed may vary from a hundred pounds, or less, to several thousand pounds, and it is often desirable to be able to weigh such different loads in the same hopper, tank or bin.

One of the disadvantages of the prior art load cells is that those cells which are adapted for very heavy loads, of the order of a thousand pounds or more, are relatively insensitive and largely inaccurate in the measurement of substantially lighter loads of the order of one hundred pounds or so. Thus, it has heretofore been necessary to employ a plurality of weighing systems, or a plurality of separate load cells, in order to accommodate a wide range of different loads. Another drawback of the prior art devices has been inherent in accuracy due to hysteresis errors in the stiff metallic diaphragm members heretofore employed. Additional errors have resulted with the prior art load cells from the application of cross loads (i.e., lateral forces at 90° to the normally applied load) causing the movable members of the load cell to bind. Cross loads are virtually unavoidable in most applications because of inherent expansion or contraction of the large containers which rest upon the load weighing cells. The above identified copending application is directed in part to means for eliminating, or at least minimizing, the errors of cross-loads. When hydraulic load cells are mounted under one end of large metallic bins, material containing hoppers, or liquid containing tanks, for the purpose of weighing loads contained therein, the cells are subjected not only to vertical forces which vary with the weight of the contained materials, but also they are subjected to lateral forces which vary with the expansion or contraction of the container due to temperature changes. Additionally, since such containers are normally required to be affixed to a relatively permanent support at at least one point, the supporting load cell may be subjected to angular or rotational forces due to unequal expansion or contraction of different portions of the container. Thus, if the top of the container should expand or contract to a lesser degree than the bottom thereof, angular or torsional forces will be applied to the supporting load cell proportional to changes in environmental temperature. One of the features of the present invention also is the provision of improved means for substantially eliminating the effects of cross loads, and torsional forces, and for very substantially reducing the errors caused thereby.

One of the objects of the invention is to provide an improved hydraulic type weighing cell capable of more accurate response to applied loads. Another object is to provide such a hydraulic cell capable of responding to a greater range of variable applied loads. A further object is to provide an improved load cell construction wherein the accuracy of response to applied loads is not materially affected by reason of lateral cross loads. An additional object is to provide a hydraulic load cell which is substantially free from hysteresis errors, so that the same fluid pressure is produced by repeated applications of a given load regardless of changes in the loads applied between such repeated applications. A more general object is to provide an improved load cell construction which overcomes the disadvantages of the prior art devices above enumerated. Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

In general the objects and advantages of the invention are achieved by a novel load cell structure employing a thin, highly flexible diaphragm interposed between the walls of the fluid containing cylinder and cooperating piston portion, together with low friction centering and guiding means for maintaining axial alignment between the relatively movable members. Additional means are provided for accommodating cross loads or lateral thrust without impairing or impeding normal motion in response to applied vertical loads. The combination of the thin flexible diaphragm and axial guiding means allows substantially greater deflection of the normally movable cell members than has heretofore been possible in the prior art structures, thereby eliminating the necessity for close control over the quantity of fluid introduced in the assembly of the cell, and also eliminating errors of indicated pressure with changes in temperature. The low stiffness provided by the structure enables the load cell of the invention to respond accurately to a wider range of applied loads.

For a fuller understanding of the nature and objects of the invention, reference should be had to the following detailed description taken in connection with the connection with the accompanying drawings in which corresponding parts of the several figures are identified by like references.

FIGURE 2 is a cross-sectional view of the assembled cell structure according to a preferred embodiment of the invention, with a flexible dust jacket or boot clamped in place;

FIGURE 3 is a top sectional view of the load cell assembly of FIGURE 2, taken along the line 3—3 of FIGURE 2;

FIGURE 4 is another top sectional view of the same cell assembly taken along the line 4—4 of FIGURE 2, to show the axial centering and guiding means;

FIGURE 5 is an enlarged vertical section taken along the line 5—5 of FIGURE 4, showing a detail of the means for holding the relatively movable members of the cell in assembled relation; and FIGURE 6 is a vertical view, partly cut away, of a modified cell structure according to the invention, particularly adapted to weigh loads in tension rather than in compression.

Figure 1:
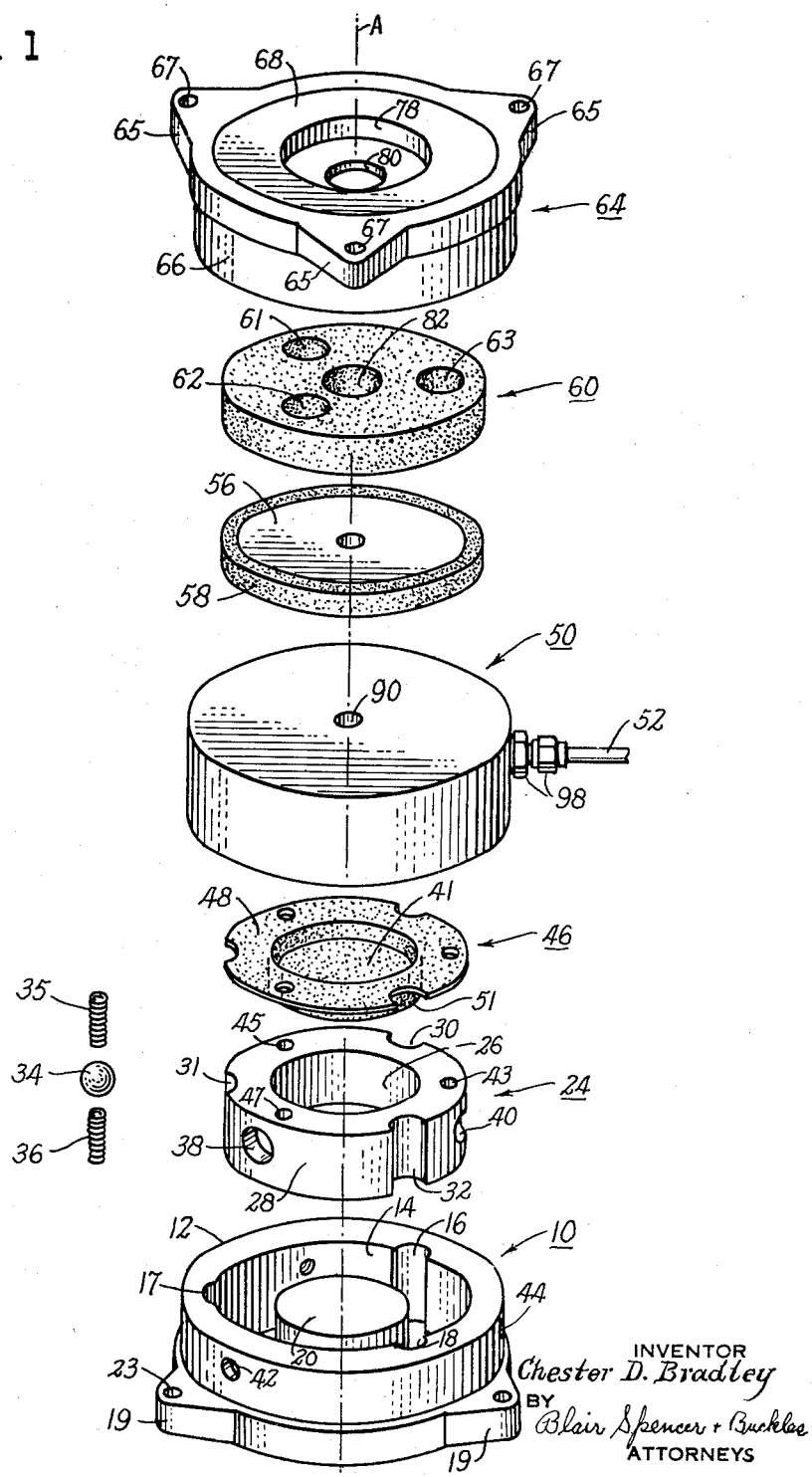
FIGURE 1 is an exploded perspective view of the cell structure according to one embodiment of the invention, showing the essential parts thereof.

Referring now to FIGURE 1 of the drawings, the structure of the load cell according to one embodiment of the invention may be seen to comprise a substantially cylindrical base member indicated generally at 10, which in the preferred embodiment comprises an annular wall portion 12 having a cylindrical inner wall 14 in which are recessed a plurality of substantially semi-cylindrical recesses 16, 17 and 18. Base 10 is provided with radially extending ears 19 through which are pierced holes, as at 23, whereby the cell structure may be securely mounted to a suitable foundation. A fixed cylindrical piston portion 20 extends upwardly from the base portion of member 10, within the annular opening formed by cylindrical wall 14. Piston 20 is preferably formed integral with base member 10, as by metal casting, with suitable surface finishing by common machinery operations. A substantially cylindrical collar member 24, has a cylindrical opening 26 adapted to fit loosely over piston member 20, and an outer cylindrical wall 28 of substantially lesser diameter than annular opening 14 in base member 10. A plurality of substantially semi-cylindrical recesses 30, 31 and 32 in the outer surface 28 of collar 24 are adapted to be aligned axially with the corresponding recesses 16, 17 and 18 to form therebetween a plurality of ball races parallel to the vertical axis A of the cell assembly. When the cell is assembled a ball bearing such as 34 (see FIGURE 1 and FIGURE 2) is held in each of these races by flexible means such as compression springs 35 and 36. A plurality of radial openings 38 and 40 formed in the outer cylindrical wall 28 of collar 24 cooperate with cap screws mounted in tapped holes 42 and 44 in the base member 10 to hold the collar 24 in loosely assembled engagement with base member 10 while permitting limited axial motion therebetween.

Still referring to FIGURE 1, a cup-shaped flexible diaphragm 46, which is preferably formed of impervious pliable plastic material, includes an outer, substantially plane, flange portion 48 which is clamped by means (not shown in FIGURE 1) between the upper plane surface of collar 24 and the corresponding lower plane surface of a hydraulic pressure block 50, in such manner that the united block 50, diaphragm 46 and collar 24 comprise a movable cylinder cooperatively engageable with fixed piston 20 of base member 10. The central portion 41 of diaphragm 46 is formed as a plane-bottomed, cylindrical, cup-like depression depending from flange 48. When assembled the central portion 41 of diaphragm 46 overlies the plane surface of piston 20, while an annular loop (51 in FIGURE 2) of flexible diaphragm 46 interlies between the cylindrical side wall of piston 20 and the cylinder opening 26, thereby providing a substantially friction-free hydraulic seal between the fixed piston 20 and the movable cylinder 24. Hydraulic pressure from a suitable fluid injected into the remaining space between the upper surface 41 of diaphragm 46 and the lower surface of hydraulic block 50 is carried through a fluid pressure line 52 to a suitable pressure gauge or indicator (not shown). For ease of manufacture, and economy in handling, the larger portions of the cell structure, including base 10, cylinder 24, block 50 and cap 64, may all be formed of aluminum.

The remaining load cell structure as shown exploded in FIGURE 1 provides means for eliminating the undesirable effects of lateral thrust or cross loads as may be caused, for example, by thermal expansion of the load carrying or load applying structure. These means comprise a load bearing plate 56, preferably formed of hardened steel, surrounded by a compressible rubber annular ring 58. Above this is a resilient member 60, which may be formed of compressible rubber or the like, containing a plurality of openings 61, 62 and 63, adapted to receive and contain a load supporting ball bearing, as seen more clearly in FIGURE 2. A top cap, indicated generally at 64, to which a compression load may be directly applied, completes the structure as shown in FIGURE 1. Cap 64 is provided with a plurality of radially extending ears, as at 65, which are formed integral with the cylindrical portion 66, and which are pierced by mounting holes, as at 67, for the convenient mounting of a load carrying structure.

Referring now in greater detail to FIGURE 2 of the drawings, the cap member indicated generally at 64 may be seen to comprise a substantially cylindrical casting 66 which may be formed of any durable metal such as, for example, aluminum, bronze or iron. For the reasons above mentioned, I prefer to use cast aluminum. An annular member 68 of hard metal, such as hardened steel, is inserted into an annular recess in the top of casting 66 as shown in FIGURE 2. Between the plane bottom surface 69 of hardened insert 68 and the upper hardened surface 70 of bearing plate 56 are inserted a plurality of steel ball bearings 72 to transmit applied loads from cap 64 to hydraulic pressure block 50. Ball bearings 72 are normally retained substantially equidistant from the axis A by the surrounding resilient material 60. As seen in FIGURE 1 and FIGURE 2, the hardened steel insert 68 has formed in the center thereof an annular recess 78, in the central portion of which is formed an enlarged opening 80. When the structure is assembled opening 80 corresponds to and is aligned with opening 82 in the resiliently compressible member 60. The entire cap assembly 64 is secured to the hydraulic pressure block 50 by means of a shoulder screw 74 which passes through a rigid metallic washer 76, the opposite end of screw 74 being threaded into a tapped recess 84 in the central portion of block 50.

As shown clearly in FIGURE 2, the washer 76 is of substantially smaller diameter than the annular opening 78, and the shank of screw 74 is smaller, by the same amount, than the diameter of aligned openings 80 and 82. Thus, the cap assembly 64 is enabled to move laterally a limited distance in any direction, subject only to the restraining force of compressible resilient members 58 and 60. Preferably the shank 86 of screw 84 is of larger diameter than the threaded end 84, and the shaft 86 is formed with an annular shoulder 88 adapted to be seated in a corresponding recess 90 in the upper surface of block 50 whereby, when the screw 74 is firmly seated, no appreciable force is exerted thereby between upper bearing plate 68 and lower bearing plate 56, thus permitting rolling motion of the bearing balls 72 between the bearing plate surfaces 69 and 70. In this manner the cap 64 is permitted limited lateral movement to accommodate thermal expansion or contraction of any container or other structure which may be mounted thereon, without affecting the vertical forces applied therethrough to block 50.

As seen also in FIGURE 2, normal openings 92 and 94 are drilled in block 50 to intersect at junction 96, and suitable external pipe fittings 98 are secured to the side of block 50 in engagement with opening 92 to provide an open passage for the flow of hydraulic fluid from chamber 100 to external pressure line 52. As was mentioned above, line 52 connects with a suitable pressure gauge or indicator (not shown) of which various forms are known in the art.

Still referring to FIGURE 2 it will be seen that the peripheral flange portion 48 of flexible diaphragm 46 is securely clamped between annular ring 24 and block 50 by means of machine screws 101, 102 and 103 (FIGURE 4) which pass through vertical holes 43, 45 and 47 (FIGURE 1) in annular ring member 24 and are threaded into corresponding tapped holes in the base of block 50 (see tapped hole 49 in FIGURE 2). As shown further in the assembled structure of FIGURE 2, the central portion 41 of flexible diaphragm 46 overlies the plane surface of cylindrical piston member 20 in base 10, while the annular folded loop portion of flexible diaphragm 46 lies between in the cylinder wall 26 and the cylindrical outer wall of piston 20. The base 10 is loosely coupled to the block 50 as will be described hereinafter in reference to FIGURE 4 and FIGURE 5 of the drawings.

As shown in FIGURES 2, 3, 4, and 6, a flexible jacket or dust boot 110 covers the external space between base 10 and block 50, being tightly held in place by cylindrical clamps 112 and 114 which respectively encircle the upper and lower edges of boot 110 to clamp these portions of the boot respectively to block 50 and base 10. In the cylindrical space remaining between the outer cylindrical wall 31 of the annular member 24 and the inner cylinder wall 17 of base 10, as seen in FIGURE 2, are positioned a plurality of ball bearings 34 which are retained in substantially centered position, as shown, by compression springs 35 and 36. Balls 34 permit vertical rolling action between parallel cylindrical walls 31 and 17 and thus serve to restrain and restrict relative movement between base 10 and block 50 in a substantially vertical direction along axis A as shown. In the preferred embodiment, three such vertically guided ball bearings 34 are employed and are positioned equidistant from each other as shown in FIGURE 4. These ball bearings 34–34–34 permit substantially friction-free vertical motion of block 50 with respect to stationary base 10, but effectively prevent any non-axial movement therebetween. In combination with horizontal rolling balls 72 of cap 64, vertical balls 34 effectively maintain low friction axial motion between hydraulic block 50 and piston 20, at all times, regardless of any slight angular misalignment therebetween. While compression springs 35 and 36 are shown as the preferred means for maintaining the desired positioning of ball bearings 34–34–34, it is to be understood that other resiliently compressible means, as for example, rubber, may be employed in lieu of the springs as shown. Thus, by means of the three point vertical guidance provided by the balls 34–34–34, the movable cylinder formed by block 50 and annular member 24 is enabled to operate with a minimum of friction and with proper clearance between cylinder wall 26 and the cylindrical wall of piston 20, without pinching or otherwise deforming the annular loop 57 of flexible diaphragm 46. This structure allows the movable portion of the cell, comprising head 64 and block 50 to deflect as much as 1/8 of an inch, or even more, as contrasted with a maximum deflection of .005 inch in load cells of the prior art which employ metallic diaphragms. The larger volume of hydraulic cavity 100, coupled with the greater degree of deflection permissible, eliminates the requirement of the prior art structures for extreme care and accuracy in filling the chamber with hydraulic fluid. Reduced stiffness and hysteresis also eliminates the problem of false indication in pressure changes due to temperature changes.

Reference to the top sectional view of FIGURE 3, which is taken along the line 3—3 of FIGURE 2, shows the normal location of load bearing balls 72–72–72 positioned in their respective sockets in resilient material 60 all equidistant from each other and from the axis of screw shank 86, which in turn is normally centrally disposed in the opening 82 through the central portion of resilient material 60. This view also shows clamping screw 116 affixed to the upper cylindrical band clamp 112 which holds the upper flange of boot 110 to the cylindrical body of block 50. A similar clamping screw (not shown) secures the lower clamp 114 and the bottom of dust boot 110 to the cylindrical portion of base member 10.

FIGURE 4, which is a top sectional view taken along the line 4—4 of FIGURE 2, shows upper compression springs 36–36–36 which hold the vertical guiding balls 34–34–34 in their operative position with respect to block 50. This view also shows the substantial annular clearance 118 between movable cylinder member 24 and fixed base 10. Cap screws 121, 122 and 123, which extend horizontally through the outer wall 12 of base member 10 into enlarged recesses 124, 125 and 126 in the annular cylinder member 24, may be seen in dotted representation in FIGURE 4.

Referring to FIGURE 5 of the drawings, the manner in which these lateral cap screws, such as 121, protrude into recesses, such as 124, to effectively limit axial movement between block 50 and base 10 may be clearly seen.

Referring now to FIGURE 6 of the drawings, one modified form of structure according to the invention comprises a hydraulic cell unit which is substantially the same as the hydraulic piston and cylinder structure of FIGURE 2, but here modified to measure loads in tension rather than in compression. Accordingly, no top load bearing balls (such as 72 in FIGURE 2) are provided but in lieu thereof base 10 and hydraulic pressure block 50, as assembled, are mounted on a raised annular base 130 which is secured to the original base structure 10 by means of a plurality of recessed screws such as 132. A plurality of additional vertical openings, such as 134, are passed through base member 10 in alignment with threaded holes tapped into the bottom surface of annular cylinder member 24. Machine screws 136 passed through corresponding bushings 138 serve to hold a draw bar or tension plate 140 in constant rigid engagement with movable annular cylinder member 24. With this arrangement of structure, elevated base 130 may rest upon or be mounted to a floor surface or overhead beam indicated generally at 131 in FIGURE 6, having an opening 142 through which a tension load bar 144 extends odownwardly. A crane or other suitable suspension means may be attached to the lower end of tension bar 144, and thus loads applied downwardly thereby may be weighed by means of the hydraulic load cell of the invention. The vertical rolling ball guide means of this load cell structure (as described hereinabove with reference to FIGURES 2, 3 and 4) provides torsional staying, to effectively prevent any axial rotation between the relatively movable members, thus protecting the light weight highly flexible diaphragm from possible damages.

An alternative, and more simplified embodiment of the invention, which is useful in many applications and is more economical of manufacture than the complete structures of FIGURE 2 or FIGURE 6, comprises the essential hydraulic cell unit of FIGURE 6 without the raised annular base member 130 and the tension coupling means 136, 138, 140 and 142. From an examination of FIGURE 6 with these members removed, it will be seen that this simplified embodiment comprises the same essential hydraulic cell structure of FIGURE 2, less the lateral thrust compensating means of cap 64 as shown in FIGURE 2. Thus, for use in weighing installations where lateral thrust or cross loads may not pose a serious problem the load may be applied directly to the upper plane surface of hydraulic block 50 (as seen in both FIGURE 2 and FIGURE 6), thereby eliminating the requirement of cap 64 and its horizontal rolling balls 72 (and all the other parts associated therewith) in the structure of FIGURE 2. Even where some cross-loading or lateral thrust may be present, this simplified embodiment of the invention offers substantially improved operation over that obtainable by weighing cells of the prior art, by reason of the improved low-friction vertical guiding means, and the increased hydraulic chamber deflection afforded by the closely-looped thin flexible diaphragm of the weighing cell structure.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

I claim:

1. A fluid pressure load cell for weighing apparatus comprising, in combination, a stationary base member having a substantially vertical load-bearing axis, a second member in substantial axial alignment with said base member and movably mounted thereon for substantially vertical axial motion relative thereto, means forming a cylinder portion on one of said members, further means forming a cooperative piston portion on the other of said members, said cylinder and piston portions adapted to freely interfit with each other without frictional engagement therebetween, a relatively thin flexible diaphragm of fluid impervious material sealed to said cylinder portion and overlying said piston portion to form a fluid pressure chamber therebetween, an annular fold of said diaphragm interlying a portion of the free space between said cylinder and piston portions, a fluid pressure passage leading from said pressure chamber to means for connection to an external pressure line, ball and race guiding means between said base member and said second member for limiting relative movement therebetween substantially in the direction of said vertical load-bearing axis, a laterally movable load bearing member mounted upon said second member and adapted to yield in a generally horizontal direction substantially normal to said load-bearing axis, and a laterally compressible element resiliently urging said load bearing member to a central no cross-load position, whereby the forces of cross loads applied to said load bearing member are not transmitted along said substantially vertical load-bearing axis, and normal axial motion between said base and movable second member remains substantially unaffected by the lateral thrust of such cross loads.

2. The combination of claim 1 in which said laterally yieldable load bearing member includes a plurality of ball bearings mounted in horizontally yieldable sockets of resiliently compressible material, said ball bearings being interposed between an upper substantially horizontal plane bearing surface of said load bearing member and a parallel plane lower bearing surface of said movable second member, to afford limited rolling motion between said load bearing member and said second member, said rolling motion being normal to the axis of applied loads.

3. In a fluid pressure load cell for weighing apparatus having an axially movable piston and cylinder structural arrangement, the improvement comprising lateral thrust absorbing means including a movable load bearing member mounted for rolling movement upon a substantially plane surface normal to the axis of said piston and cylinder structure, and resiliently compressible means laterally disposed between axially parallel portions of said load bearing member and said piston and cylinder structural arrangement.

4. In a fluid pressure load cell for weighing apparatus having an axially movable piston and cylinder structural arrangement, the improvement comprising lateral thrust absorbing means including a movable load bearing member mounted upon said piston and cylinder structure, means resiliently urging said load bearing member to a central no cross-load position, and means within said structure to maintain axial movement of said piston in said cylinder even though said load bearing member has been laterally displaced.

5. The lateral thrust absorbing means defined in claim 4 wherein said movable load bearing member comprises a plurality of balls laterally spaced from one another.

6. The thrust absorbing means defined in claim 5, wherein said balls are laterally spaced by a resilient spacer member having means forming sockets therethrough for positioning said balls.

7. In a fluid pressure load cell for weighing apparatus having an axially movable piston and cylinder structural arrangement, the improvement comprising lateral thrust absorbing means including a movable load bearing member mounted for rolling movement upon a substantially plane surface normal to the axis of said piston and said cylinder structure, and resiliently compressible means laterally disposed between axially parallel portions of said load bearing member and said piston and cylinder structural arrangement, and means within said structure to maintain axial movement of said piston in said cylinder even though said load bearing member has been laterally displaced.

8. A hydraulic weighing device comprising in combination a hydraulic cylinder, a piston adapted to interfit within said cylinder during axial movement of said piston, a diaphragm sealed to said cylinder and overlying said piston to form a fluid pressure chamber between said cylinder and said piston, a load bearing member, a lateral thrust absorber joining said load bearing member with one of said piston and said cylinder for transmitting the axial component of a load applied to said load bearing member to the fluid pressure chamber, a resilient centering member positioned laterally between a portion of one of said piston and said cylinder and a portion of said load bearing member, and axially movable rollers between said piston and said cylinder, said rollers and said lateral thrust absorber allowing transverse movement of said load bearing member and universal movement of said piston with respect to said cylinder, said rollers restricting translation of said piston transversely with respect to said cylinder.

References Cited in the file of this patent

UNITED STATES PATENTS

| | | |
|---|---|---|
| 123,621 | Duckham | Feb. 13, 1872 |
| 1,023,154 | Kenerson | Apr. 16, 1912 |
| 1,222,760 | Heim | Apr. 17, 1917 |
| 1,628,440 | Smithers | May 10, 1927 |
| 1,878,835 | Fleischmann et al. | Sept. 20, 1932 |
| 2,430,702 | Bohann | Nov. 11, 1947 |
| 2,472,047 | Ruge | May 31, 1949 |
| 2,665,958 | Waldherr | Jan. 12, 1954 |
| 2,960,113 | Bradley | Nov. 15, 1960 |
| 3,004,558 | Crane | Oct. 17, 1961 |